United States Patent [19]

Westover et al.

[11] 3,900,191

[45] Aug. 19, 1975

[54] CARD ADVANCING AND FUNCTION PERFORMING METHODS AND APPARATUS

[75] Inventors: Dwight G. Westover, Sierra Madre; Frederic F. Grant, Bellflower, both of Calif.

[73] Assignee: Bell & Howell Company, Chicago, Ill.

[22] Filed: Nov. 30, 1973

[21] Appl. No.: 420,738

[52] U.S. Cl. ................ 271/3; 271/DIG. 9; 346/138

[51] Int. Cl. ........................... B65h 5/06; B65h 29/22

[58] Field of Search ........ 271/3, 4, DIG. 9; 346/138

[56] References Cited

UNITED STATES PATENTS

| | | | |
|---|---|---|---|
| 2,431,360 | 11/1947 | Philpott | 346/138 |
| 3,755,653 | 8/1973 | Venker | 271/DIG. 9 |
| 3,790,159 | 2/1974 | Hatzmann et al. | 271/4 |

*Primary Examiner*—Evon C. Blunk
*Assistant Examiner*—Robert Saifer
*Attorney, Agent, or Firm*—Benoit Law Corporation

[57] ABSTRACT

Card advancing and function performing methods and apparatus place a card in a first region, and advance the card from such first region by way of a first path to a second region, whereby a first edge portion of the card leads an opposite second edge portion of the card. The desired function relative to the card is performed in the second region, and the second edge portion is made to lead the first edge portion of the card. The card is returned from the second region to the first region by way of a second path different from the first path with the second edge portion continuing to lead the first edge portion of the card. The second path is located between the first path and the second region, and the leading second edge portion is depressed into the second path for a return of the card to the first region.

17 Claims, 16 Drawing Figures

CARD ADVANCING AND FUNCTION PERFORMING METHODS AND APPARATUS

CROSS - REFERENCES

The following United States patents and/or copending patent applications, filed of even date, disclose or disclose and claim subject matter which is shown herein and/or which may be employed in the practice of the subject invention. These patents or applications are assigned to the same assignee as the subject patent application or patent and are herewith incorporated by reference herein.

Ser. No. 420,503, entitled Communication Methods and Billing Systems, by R. A. Boyle, E. S. Gilchrist and R. L. Visser;

Ser. No. 420,734, entitled Communication Methods and Billing Systems, by E. S. Gilchrist and R. L. Visser;

Ser. No. 420,735, entitled Methods and Apparatus for Performing a Function Relative to a Card, by F. F. Grant;

Ser. No. 420,736, entitled Printing Apparatus, by E. S. Gilchrist and F. F. Grant;

Ser. No. 420,737, entitled Sheet Advancing Methods and Apparatus, by F. F. Grant;

Ser. No. 420,739, entitled Printing Methods and Apparatus, by R. M. McManaman; and Ser. No. 420, 740, entitled Character Expressing and Printing Methods and Apparatus, by E. S. Gilchrist and A. B. Nayak.

BACKGROUND OF THE INVENTION

1. Field of the Invention

The subject invention broadly relates to card advancing and function performing methods and apparatus. By way of example, and not by way of limitation, a field of utility of the subject invention resides in card printing and/or reading equipment wherein cards are moved to and from a printing and/or reading station.

2. Description of the Prior Art

Despite the vast amount of prior-art techniques and equipment in the above mentioned field, there persists a need for methods and apparatus wherein cards are economically and reliably advanced from a first region to a second region where a desired function is performed relative to the card, and are thereupon returned to the first region.

There also exists a need for economic and reliable methods and apparatus wherein cards from a first stack are serially processed and are thereupon piled up on a second stack.

Existing solutions or proposals in this field are either unreliable or rather expensive. Moreover, prior-art solutions which would have the requisite reliability in card handling and feeding are incapable of satisfying an existing need for portable or compact and inexpensive stationary card moving and function performing apparatus.

SUMMARY OF THE INVENTION

It is an object of this invention to satisfy the above mentioned needs.

It is an object of this invention to provide improved methods and apparatus for performing one or more functions relative to one or more cards.

It is an object of this invention to provide improved methods and apparatus for moving or advancing cards.

It is a related object of this invention to provide improved methods and apparatus for advancing cards from a stack of cards.

Other objects of this invention will become apparent in the further course of this disclosure.

From one aspect thereof, the subject invention resides in a method of performing a function relative to a card, and resides, more specifically, in the improvement comprising in combination the steps of placing said card in a first region, advancing said card from said first region by way of a first path to a second region, whereby a first edge portion of the card leads an opposite second edge portion of the card, performing said function relative to said card in said second region, providing a second path different from said first path and leading from said second region to said first region, and locating said second path between said first path and said second region, making said second edge portion lead said first edge portion of the card, depressing said leading second edge portion into said second path, and returning said card from said second region to said first region by way of said second path different from said first path with said second edge portion continuing to lead said first edge portion of the card.

From another aspect thereof, the subject invention resides in a method of performing a function relative to a number of cards, and resides, more specifically, in the improvement comprising in combination the steps of placing said cards in the form of a stack of cards in a first compartment of a first region, advancing said cards one by one from said stack of cards in said first compartment to a second region by way of a first path leading from said first compartment to said second region, whereby a first edge portion of each card leads an opposite second edge portion of that card, performing said function relative to each card in said second region, providing a second path different from said first path and leading from said second region to said first region, and locating said second path between said first path and said second region, making said second edge portion of each card lead said first edge portion of that card and moving each card from said second region to a second compartment in said first region before said function is performed relative to the next card in said stack, the cards being moved from said second region by said second compartment in said first region by depressing said leading second edge portion of each card into said second path and advancing each card by way of said second path, the latter advanced cards being stacked in said second compartment in said first region.

From another aspect thereof, the subject invention resides in apparatus for performing a function relative to a card, and resides, more specifically, in the improvement comprising, in combination, means for storing said card in a first region of said apparatus, means defining a first channel between said first region and a second region of said apparatus, means for advancing said card from said first region by way of said first channel to said second region, whereby a first edge portion of the card leads an opposite second edge portion of the card, means for performing said function relative to said card in said second region, means defining a second channel extending between said second region and said first region and being located between said first channel and said second region, means for reversing the direction of movement of said card whereby said second edge portion leads said first edge portion, and means for depressing said leading second edge portion into said second channel, said reversing means including means for returning said card from said second region to said first region at said reversed direction of movement and by way of said second channel.

From another aspect thereof, the subject invention resides in apparatus for performing a function relative to a number of cards, and resides, more specifically, in the improvement, comprising, in combination, means for defining a first compartment, means for receiving said cards in the form of a stack of cards in said first compartment, means for providing a first channel between said first compartment and a predetermined region of said apparatus, means for advancing said cards one by one from said stack of cards in said first compartment to said predetermined region by way of said first channel, whereby a first edge portion of each card leads an opposite second edge portion of that card, means for performing said function relative to each card in said predetermined region, means for defining a second compartment, means for providing a second channel extending between said predetermined region and said second compartment and being located between said first channel and said predetermined region, means for reversing the direction of movement of each card in said predetermined region whereby said second edge portion of each card leads said first edge portion of that card, and means for depressing said leading second edge portion of each card into said second channel, said reversing means include means for moving each card from said predetermined region to said second compartment before said function is performed relative to the next card in said stack, and for so moving said card in said reversed direction of movement from said predetermined region to said second compartment by way of said second channel, and means for stacking said moved cards in said second compartment.

From yet another aspect thereof, the subject invention resides in apparatus for performing a function relative to a card, and resides, more specifically, in the improvement comprising in combination, means for storing said card in a first region of said apparatus, means defining a first channel between said first region and a second region of said apparatus, means defining a second channel extending between said second region and said first region and being located between said first channel and said second region, means for advancing said card from said first region by way of said first channel to said second region, whereby a first edge portion of the card leads an opposite second edge portion of the card, means in said second region for moving said card in a first direction wherein said first edge portion leads said second edge portion, and alternatively in a second direction wherein said second edge portion leads said first edge portion, means for performing said function relative to said card in said second region, means at said second region for positioning said leading first edge portion of said card into engagement with said card moving means in said second region and for alternatively depressing said leading second edge portion of said card into said second channel, and means for returning said card from said second region to said first region by way of said second channel with said second end portion leading said returning card through said second channel.

The expression "card" as herein employed is not intended to be interpreted in a limiting sense. Rather, the meaning of that term is intended to include not only cards in their popular meaning, but also other sheet-like objects or sheets of material.

BRIEF DESCRIPTION OF THE DRAWINGS

The invention will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
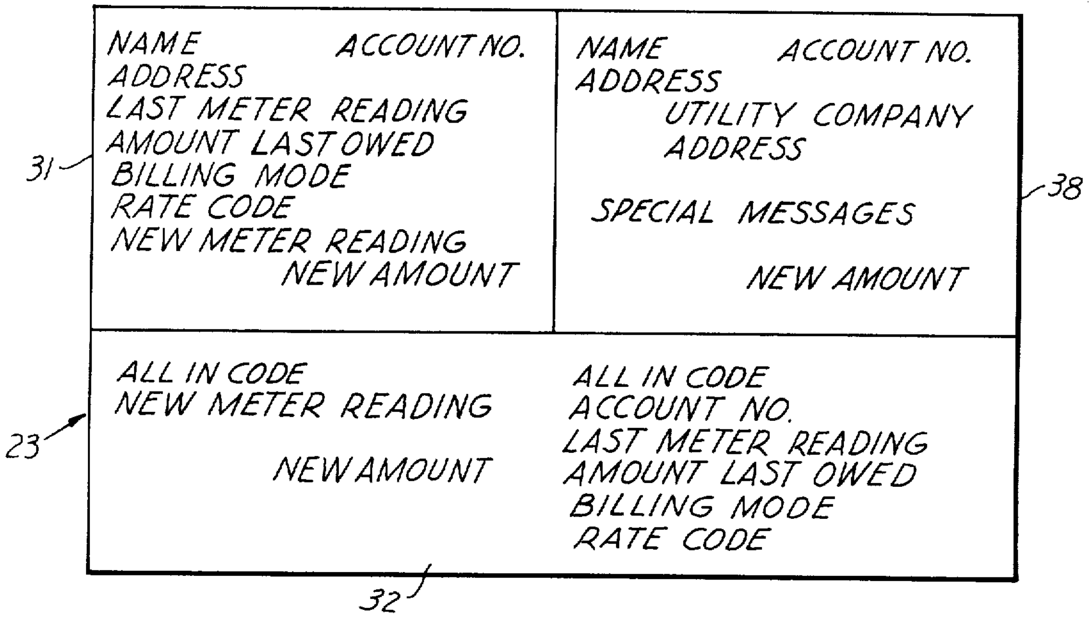
FIG. 1 is a plan view of a record card that may be employed in the practice of the subject invention.

By way of example, and not by way of limitation, the apparatus 28 shown in the drawings may have utility as a portable billing apparatus and will occasionally be referred to as such in the further course of this disclosure. For instance, the portable billing apparatus 28 may be employed to provide bills and billing information at customers ' addresses for utility consumption of services rendered.

In the latter vein, FIG. 1 shows a record card 23 on which account and billing information has been printed in three fields 31, 32 and 38. Depending on the application, some of that information may be preprinted on the record card 23, and the remaining information may then be printed on the card 23 by the portable billing apparatus 28. The record parts 31 and 38 may then be handed to the particular customer as a statement or bill. The record part 32 may be returned to the billing center for the purpose of subsequent verification of the amount due from the particular customer. When paying his bill, the customer would send the record part 38 along with his payment and the record part 38 would then be compared with the record part 32 to verify that the customer has paid his entire bill.

The portable billing apparatus 28 in accordance with the illustrated preferred embodiment of the subject invention will now be described with the aid of FIGS. 2 to 15.

The portable billing apparatus 28 has a housing 41 having a slot 42 at one end thereof for receiving a record card 22 on which data are to be printed. The record card 23, shown in dotted outline in FIG. 2, may be of the type shown in FIG. 1 and described above.

A supporting structure with side frames 43 and 44 is provided inside the housing 41 for mounting the mechanical parts of the billing apparatus 28. A card receiving chamber 45 is defined inside the slot 42 by a pair of card guides 46 and 47 having flared or inclined receiving lips (see FIGS. 2 and 4).

Lateral guides 51 and 52 have flared or inclined lips 53 and 54 for guiding the card 23 laterally where necessary.

A card receiving platform 56 is resiliently mounted below the receiving chamber 45 by springs 47' relative to a supporting plate 48. If desired, several cards 23 may be inserted at a time through the slot 42 and receiving chamber 45 and stored on the platform 56. A lip 49 on the supporting plate 48 prevents more than one card from being fed at a time from the platform 56 to the printing area of the portable biller.

The portable biller 28 includes a handle 61 which has a manually engageable piece 62. The handle 61 is attached by screws 63 to an actuator block 64 which is slidable along bars 65 and 66.

A screw 68 connects a lug 69 to an extension bar of an actuating arm 72. The actuating arm 72 has an offset extension 73 which engages the forward end of a carriage 74 (see FIG. 4).

In this manner, the handle 61 is capable of causing sliding motion of the carriage 74 along a track 76. The carriage 74 has an extension lip 77 bent over the actuating arm extension 73.

A resilient bracket 79 mounts a roller 81 on the carriage 74 for limited rotary movement relative to the platform 56 or the card or cards located thereon.

A limited peripheral portion of the roller 81 is occupied by a high friction material 82, while the remaining peripheral portions of the roller 81 are occupied by a low friction material 83. For the purpose of illustration, the low friction material 83 has been shown in black in FIG. 4, while the high friction material 82 has been shown in white.

The roller 81 has a flat top 84 adjacent the bracket 79 so that the roller 81 is only capable of limited rotary movement, such as an angular movement of 15° in both clockwise and counterclockwise directions.

Figures 3, 6, 7:
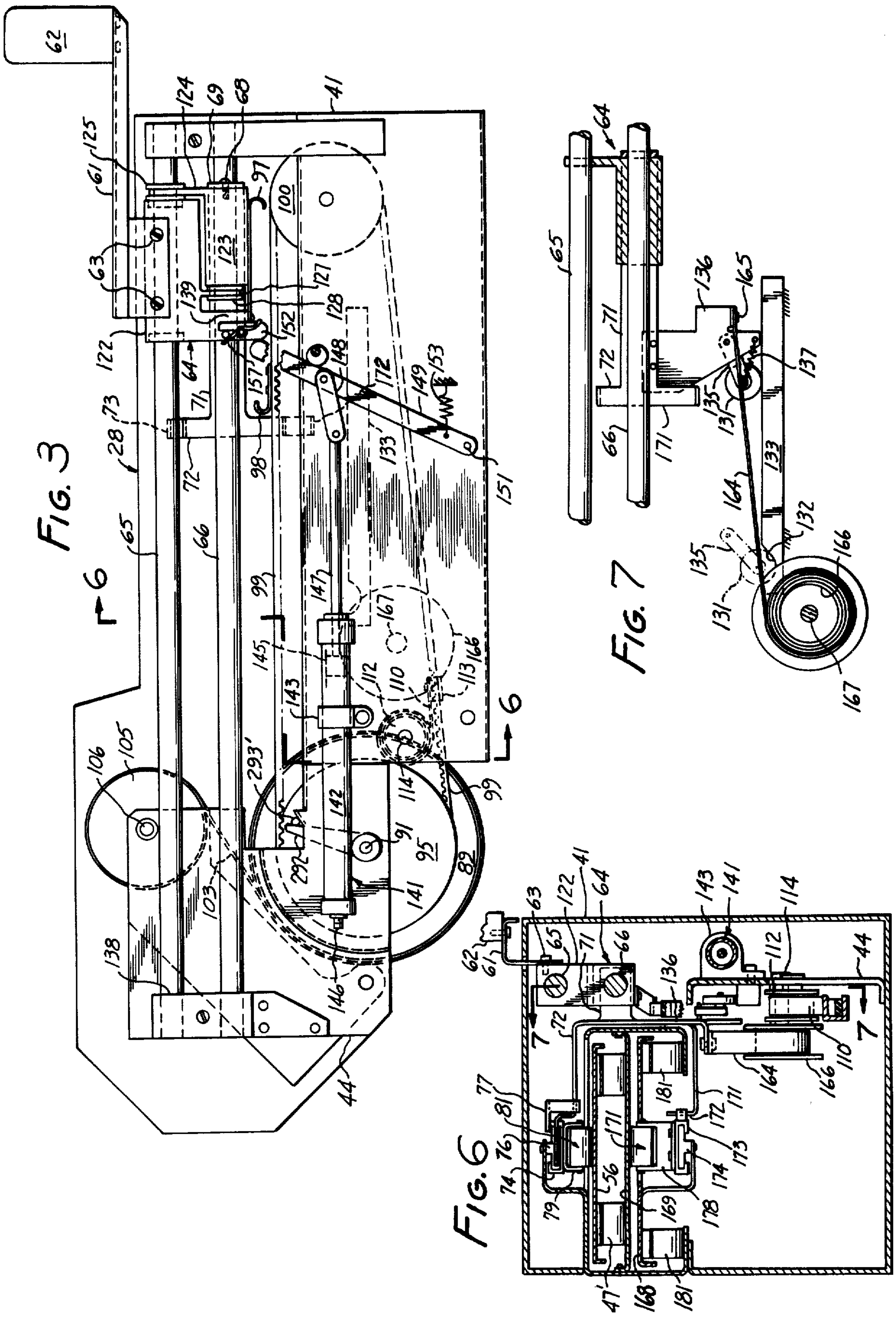
FIG. 3 is a section taken along the line 3 — in FIG. 2, with the printing mechanism having been removed.
FIG. 6 is an offset section taken along the line 6 — 6 in FIG. 3.
FIG. 7 is a partial sectional elevation taken along the line 7 — 7 in FIG. 6.
Figures 4, 8, 9, 10:
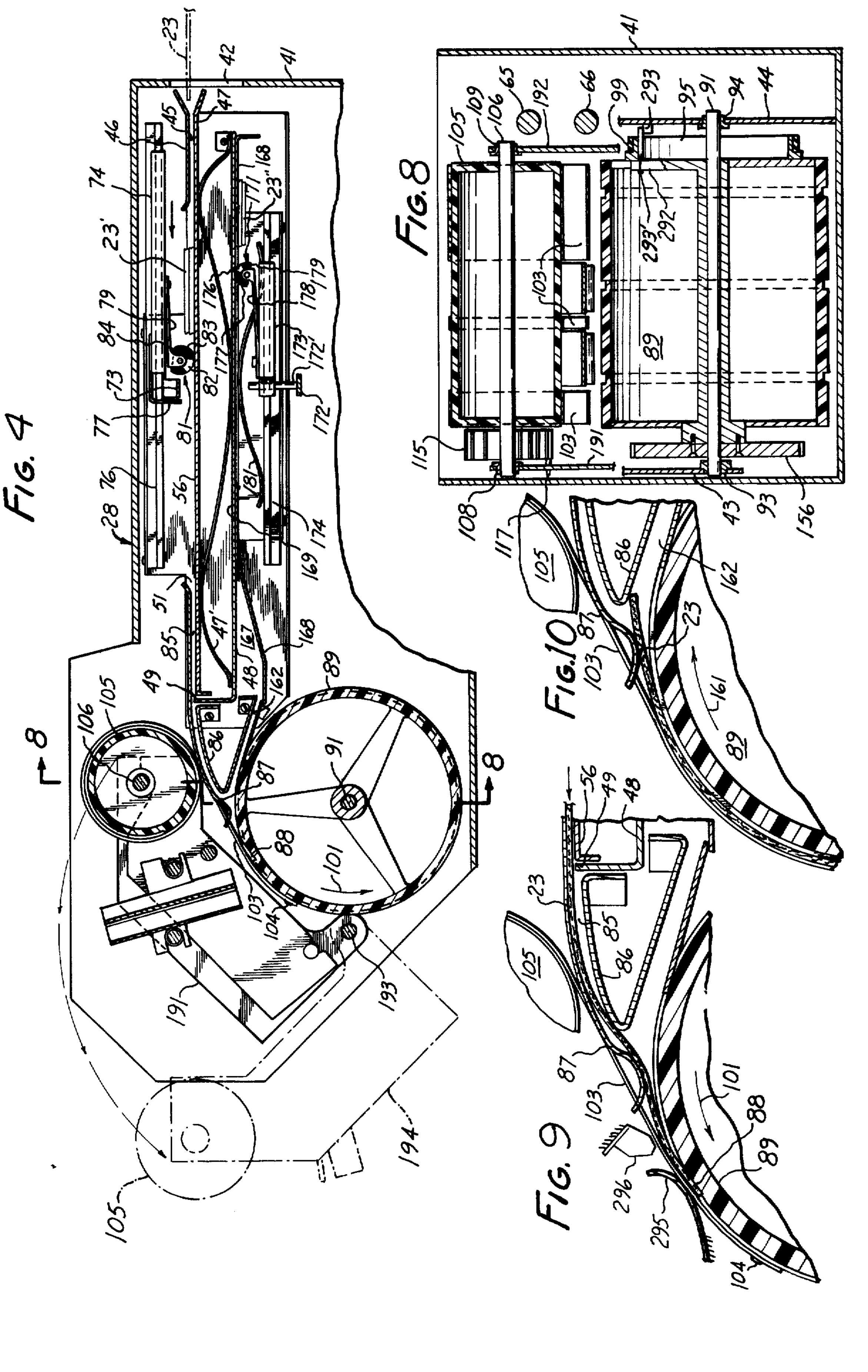
FIG. 4 is a section taken along the line 4 — 4 in FIG. 2, with the printing mechanism having been removed.
FIG. 8 is an offset section taken along the line 8 — 8 in FIG. 4.
FIGS. 9 and 10 are enlarged fragmentary views of FIG. 4.

The roller 81 is a unidirectional card advancing device. If the handle 61 and the carriage 74 are pushed to the left as seen in FIGS. 3 and 4, the high friction between the roller portion 82 and the inserted card 23 above the platform 56 causes the roller 81 to rotate slightly. This rotation is limited by the abutment of the flat roller top 84 with the supporting bracket 79 so that the high friction roller portion 82 remains in contact with the inserted card 23.

Accordingly, upon further movement of the carriage 74, the card engaged by the high friction portion 82 of the roller 82 is driven to the left into the path 85 shown in FIG. 4. A support 86 and a hold down spring 87 are mounted adjacent the gate 85. The support 86 functions as a guide.

As seen in FIG. 9, the guide 86 and hold down spring 87 cooperate in positioning the leading edge of the advancing card 23 in a recess 88 of a drum 89. The object of this juncture is to wrap the card around the drum for printing and other purposes more fully described below.

To this end, the drum 89 has a shaft 91 which, as more fully seen in FIG. 8, is rotatable in two bearings 93 and 94 attached to the frame structures 43 and 44. A gear wheel 95 is attached to the drum 89 in order to drive the drum.

As seen in FIG. 3, a hook 97 is attached to the drive block 64. When the handle 61 advances the drive block 64 to the left, the hook 97 engages a hook 98 fastened to a drive belt 99. The drive belt 99 is in force-transmitting engagement with the drive gear wheel 95 of the drum 89 and extends also over an idler pulley 100 seen in FIG. 3.

Accordingly, the advancing block 64 drives the drum 89 via the hooks 97 and 98 and the belt 99. The drum 89 is thus rotated counterclockwise in the direction of an arrow 101 shown in FIGS. 4 and 9. The advanced card 23 is wrapped around at least part of the periphery of the drum 89 during each rotary motion. To this end, belts 103 of a flexible metal or a flexible, tough plastic are attached by fasteners 104 to the periphery of the drum 89. These belts 103 further extend from the drum 89 to and around the periphery of a drum 105. The ends of the belts 103 which are opposite to the ends attached to the drum 89 are attached to the drum 105.

The drum 105 has a shaft 106 rotatable in bearings 108 and 109 attached to the frame structures 191 and 192. When the drum is rotated counterclockwise in the direction of the arrow 101 by the drive belt 99, portions of the belt 103 are progressively unwound from the drum 105 and wound onto the advancing card 23 on the drum 89.

In this manner, the card 23 is progressively wound onto the drum 89 and is held down on the drum by the belts 103.

Wrapping of the card 23 around at least part of the drum 89 is not resisted by the card drive roller 81. Rather, the advancing drum 89 and belts 103 will pull the engaged card 23 along the platform 56 which imparts a clockwise rotary motion to the roller 81. In this manner, the low friction portion 83 of the roller will be drawn into contact with the sliding card. Because of the low friction nature of the roller portion 83, the roller 81 will then not resist advancement of the card along the platform 56 and onto the drum 89.

While the handle 61 and drive belt 99 are being advanced, a coil or clock spring 110 is partially unwound from a drum 112 shown in FIGS. 3 and 6. A shaft 114 is attached to the mounting structure 44 in order to mount the spring drum 112 for rotary movement.

A coil or clock spring 115 is wound when the wrapped portions of the belts 103 are unwound from the drum 105 by the rotating main drum 89. The spring 115 has an end 116 attached to the shaft of the drum 105. An opposite end of the spring 115 extends around a pin 117 which is attached to the mounting structure 191. In this manner, the belts 103 are spring tensioned when they are wound onto the card on the drum 89.

By way of alternative, the shaft 106 can be made stationary relative to the mounting structures 191 and 192. In that case, the inner end of the spring 115 could be attached to the shaft 106 and the outer end of the spring 115 could be attached to the drum 105, with the drum 105 being then mounted for rotation on the shaft 106.

At this juncture, a closer consideration of the nature and function of the slide block assembly 64 will be helpful. As seen in FIG. 3, the slide block assembly 64 is composed to a first slide block 122 and a second slide block 123. The handle 61 is attached by the fasteners 63 to the slide block 122. The lower block has a fork portion 124 which straddles a bushing 125 slidable on the bar 65. Similarly, the block 122 has a fork 127 which straddles a bushing 128 slidable on the bar 66.

The bushing 125 fits into a bore in the slide block 122, while the bushing 128 fits into a bore in the slide block 123. In this manner, the handle 61 moves the blocks 122 and 123 of the slide block assembly 64 in unison until the block 123 is stopped.

This occurs when a roller 131 drops into a depression 132 in a bar 133 as shown in FIG. 7. The roller 131 is mounted by a linkage 135 for rotation relative to the bar 133.

The linkage 135 is connected to a bracket 136 which is attached to the bar 71. The bar 71, in turn, is attached to the slide block 123 at 68 and 69.

When the slide block assembly 64 is advanced by the handle 61, the roller 31 rolls along the bar 133 until it drops into the depression 132 as indicated in FIG. 7. A spring 137 biases the roller 131 against the bar 133 and into the depression 132.

Engagement of the roller 131 with the bar 133 at the depression 132 stops further movement of the slide block 123. Continued movement of the handle 61 then pulls the bushing 138 by action of the fork 127 away from the slide block 123. At the same time, the slide block 122 pulls off the bushing 125 retained by the fork 124 of the arrested slide block 123. At that instant, the carriage 74 will have stopped its motion on the track 76 since it is connected at 73 and 77 to the bar 71 which, in turn, is attached to the slide block 123 as mentioned above. This means that the unidirectional card advancing roller 81 will have advanced the leading edge of the engaged card 23 into the recess 88 and under part of the belt 103 as shown in FIG. 9, when the sliding block 122 separates from the sliding block 123.

Continued movement of the handle 61 will then further advance the sliding block 122 toward a stop 138.

At this juncture, it will be noted that the hook 97 shown in FIG. 3 is attached to an extension 139 of the sliding block 122 and is initially spaced from the hook 98 on the drive belt 99.

This provides a lost motion connection between the hooks 97 and 98, whereby the hook 98 only becomes engaged when the leading edge of the advanced card 23 has been located in the recess 88 of the main drum 89 as shown in FIG. 9. Once the engagement between the hooks 98 and 99 has been established, further movement of the slide block 122 away from the then arrested slide block 123 will advance the drive belt 99 which, in turn, will rotate the drum 98 counterclockwise in the direction of the arrow 101 by action on the drive wheel 95. In this manner, the advanced card 23 will be wrapped around at least part of the periphery of the main drum 89 as mentioned above.

A dashpot assembly 141 controls the forward speed of the slide block assembly 64. The dashpot assembly 141 has an air cylinder 142 attached to the mounting structure 44 by a bracket 143. A piston 145 shown in dotted lines in FIG. 3 is fitted for sliding movement in the air cylinder 141. An adjustable air valve 146 on the cylinder 141 permits adjustment of the rate of movement of the piston in the cylinder.

A piston rod 147 is connected to the piston 145. A link 148 connects the free end of the piston rod 147 to a lever 149 which is pivoted relative to the mounting structure 44 at 151.

A link 152 is pivoted on the extension 139 of the slide block 122 and acts on the lever 149 to move the piston 145 in the cylinder 142 to the left as seen in FIG. 3, against the air resistance provided by the valve 146 and against the bias of a spring 153.

This occurs when the slide blocks 122 and 123 are advanced by the handle 61 and continues when the slide block 122 is further advanced by the handle 61 after separation from the slide block 123; if desired.

At the end of the track provided by the bars 65 and 66, the motion of the slide block 122 is arrested by a stop 138. The slide block 122 may then be returned to the slide block 123 as more fully described below.

A double pawl 155 acts on a ratchet wheel 156 to arrest rotary movement of the drum 89 under the influence of the tensioned spring 115 and rotary movement of the drum 105 also under the influence of the tensioned spring 115. As shown in FIG. 8 the ratchet wheel 156 is connected to the drum 89.

The pawl 155 may now be actuated in a controlled manner to permit stepped movements of the drum 89 during printing of the desired information on the wrapped card on the drum. This phase of the operation of the portable printer 28 will be more fully described below.

For the purpose of the present disclosure, it is assumed that the required information has been printed onto the wrapped card and that it is desired to return this card 23 to the exit slot 42.

At this juncture, it will be noted that the link 152 is designed as a trigger biased by a spring 157. Accordingly, a link 152, which will override the free end of the lever 149 during movement of the slide block 122 toward the stop 138, can move back over the free end of the lever 149 when the slide block 122 is returned to its original position (see FIG. 3).

In the meantime, the bias spring 153 is free to return the lever 149 to its original position shown in FIG. 3.

During the printing process, the spring 115 rotates the drum 89 clockwise in the direction of an arrow 161 as seen in FIG. 10. Such movement of the drum 89 will eventually cause an unwrapping of the card 23 from the drum 89. During such unwrapping the hold down spring 87 will cause the then leading edge of the card 23 to impinge upon the guide 86 in its lower surface as shown in FIG. 10. This guides the card 23 into a return gate or channel 162. As seen from FIG. 10 the hold down spring effectively depresses the then leading edge of the card 23 into the return gate or channel 162, with the return gate or channel 162 being located between the gate or channel 85 and the second region of the apparatus occupied by the drum 89.

During such unwrapping of the card, the spring 115 rotates the drum 105 counterclockwise as seen in FIG. 4 in order to wind the previously unwound portions of the belts 103 again onto the drum 105. In this manner, the spring 115 also causes rotation of the drum 89 in the direction of the arrow 161. For this to occur it is necessary that the hook 97 on the slide block 122 be spaced from the hook 98 on the drive belt 99 sufficiently to permit an unwrapping of the card 23 from the drum 89.

By way of example, this may be accomplished simply by manually engaging the handle portion 62 and retracting the handle 61 from the end position at 138 to the midposition at which the slide block 122 again engages the previously separated slide block 123. Alternatively, and in accordance with the illustrated preferred embodiment, an arm 292 cooperates with a pin 293' to form a one-way clutch between the gear wheel 95 and the drum 89 and the bias of the partially unwound spring 110 may then be employed to return the slide block 122 to its midposition. In that case the gear wheel 95 acts through the pin 293' and arm 292 to advance the drum 89 in the forward direction when a card is being wrapped thereon. The drum 89 then stays in the advanced position until the double pawl 155 is released. While the drum stays in the advanced position, the spring 110 returns the gear wheel 95, drive belt 99 and slide block 122 to a midposition.

It will be recalled at this juncture that the slide block 122 became separated from the slide block 123 when the roller 131 became arrested in the recess 132 of the bar 133, as shown in dotted lines in FIG. 7.

The partial backward movement of the handle 61 just described may be effected in one operation with the previously described forward actuation. In that case the operator would actuate the handle 61 to push the slide block 122 forward to the maximum advanced position 138 and would then actuate the handle 61 to return the slide block 122 into engagement with the slide block 123.

In accordance with the illustrated preferred embodiment of the invention, the slide block 123 is connected to a free end of a spring 164 shown in FIG. 7 via the bar 71, bracket 136 and fastener 165. The spring 164 is wound on a drum 166 which is rotatable about a shaft 167 as shown in FIG. 7. The spring 164 is tensioned to wind itself fully onto the drum 166.

Accordingly, the spring 164 biases the slide block 123 against the slide block 122 so that the slide block 123 will follow the slide block 122 when the handle is actuated to move the slide block assembly 64 to the left as seen in FIG. 3. Similarly, the operator will feel the instant at which the slide block 122 has reengaged the slide block 123 since the spring 164 is then wound on the drum 166 except for a small end portion attached to the bracket 136, and since the roller 131 is then arrested in the recess 132 of the bar 133.

The operator will then release the handle portion 62 until the printing process has been completed and the card has been unwrapped from the drum 89.

The leading edge of the unwrapping card proceeds through the gate 162 into a return chamber 167 delimited by shield 168, and onto a platform 169.

At this juncture, a function which takes place during the previously described advancement of the slide block 164 has to be considered. In particular, a roller 171 is advanced from its initial position shown in FIG. 4 to an advanced position near the card return chamber 167 when the slide block 64 is first advanced to the left as seen in FIG. 3. To this end, an arm 172 shown in FIGS. 3 and 4 projects from the bar 71 which, as previously mentioned, has a portion 69 attached to the lower slide 123 at 68.

The actuating arm 172 has a pin 172' which engages a carriage 173 as shown in FIG. 4. Accordingly, the carriage 173 is advanced along a track 174 in a direction toward the card return chamber 167 when the slide block 64 is first moved to the left by the handle 61 from its initial position shown in FIG. 3. The carriages 74 and 173 thereby move in unison since they are both actuated from the same bar 71 attached to the slide block 123.

Both carriages 74 and 173 stop when the roller 131 becomes arrested in the recess 132 of the bar 133 shown in FIG. 7 and when the slide 122 then separates from the slide 123 as previously described.

At that juncture, the roller 171 is located in the vicinity of the card return chamber 167. Like the roller 81, the roller 171 is designed as a unidirectional card advancing device having a portion 176 of high friction material extending over part of its periphery and a portion 177 of low friction material extending over the remainder of its periphery. The roller 171 is mounted for limited rotary movement on a resilient support 178 which is attached to the carriage 173. A flat roller top 179 limits angular movement of the roller 171 to about 15° in each direction.

Because of the presence of the low friction portion 177 of the roller 171, the leading edge of the returning card can readily slide in between the platform 169 and the roller 171 since the rotational position of the roller 171 is then such that the high friction portion 176 of the roller is spaced from the return platform 169. Also, the shield or plate 168 is resiliently mounted by springs 181 while the roller 171 is resiliently mounted by the previously mentioned support 178.

After the printing process as to the particular card 23 has been completed, the operator engages the handle 61 at its portion 62 and moves the slide block assembly 64 to the right as seen in FIG. 3. This actuates the carriages 74 and 73 from their above mentioned advanced position toward their initial position shown in FIG. 4. In terms of roller 81, this movement has no effect on any card, since it will cause position of the low friction portion 83 adjacent the platform 56.

Accordingly, no card is removed from the platform 56, even if more than one card were previously positioned on the platform 56.

On the other hand, movement of the carriage 173 from the above mentioned advanced position toward the initial position shown in FIG. 4 will rotate the roller 171 sufficiently to place the high friction portion into engagement with the card that has been returned through the chamber 167. Accordingly, the returning roller 171 will grip the card with its high friction portion and will slide it along the return platform 169 thereby separating it fully from the drum 89.

In this manner, the unidirectional card advancing device in the form of the roller 171 will place the leading edge of the returned card at the slot 42, such that the returned card 23 can be manually engaged and removed from the apparatus 28. In the process of its renewal, the card will subject the roller 171 to a limited angular movement such that the low friction portion 177 moves into engagement with the card. The roller 171 will then offer no resistance to a manual removal of the card from the printing apparatus 28. The next card may then be moved into engagement with the drum 89 in the above mentioned manner by actuation of the handle 61.

The printing process will now be fully described with reference to the accompanying drawings.

Figures 5, 11, 12, 13:
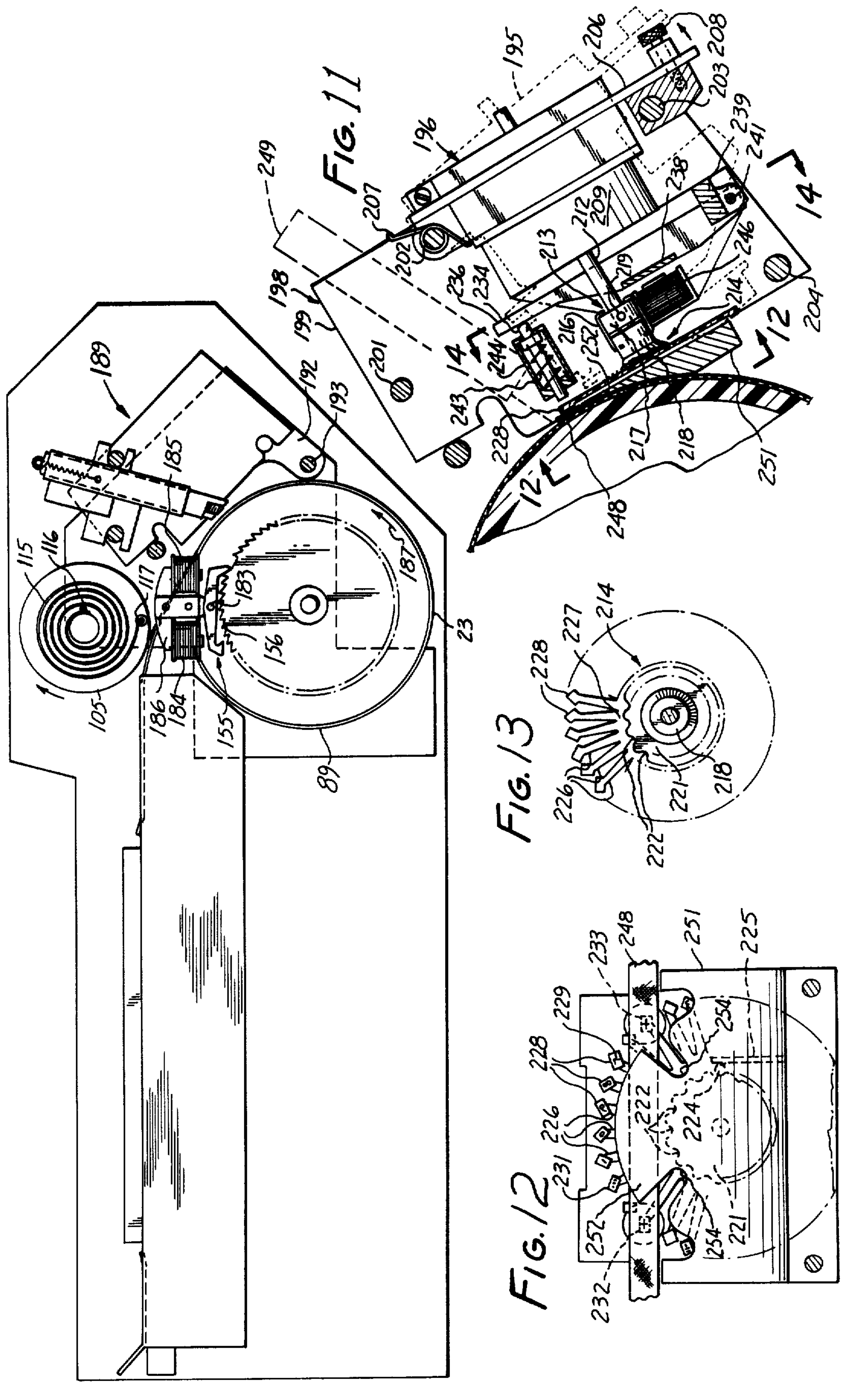
FIG. 5 is a section taken along the line 5 — 5 in FIG. 2, with the printing mechanism having been removed.
FIG. 11 is a fragmentary sectional view of the printing mechanism taken at the line 11 — 11 in FIG. 2.
FIG. 12 is a partial section taken along the line 12 — 12 in FIG. 11.
FIG. 13 is a plan view of the printing head with associated parts.
Figure 16:
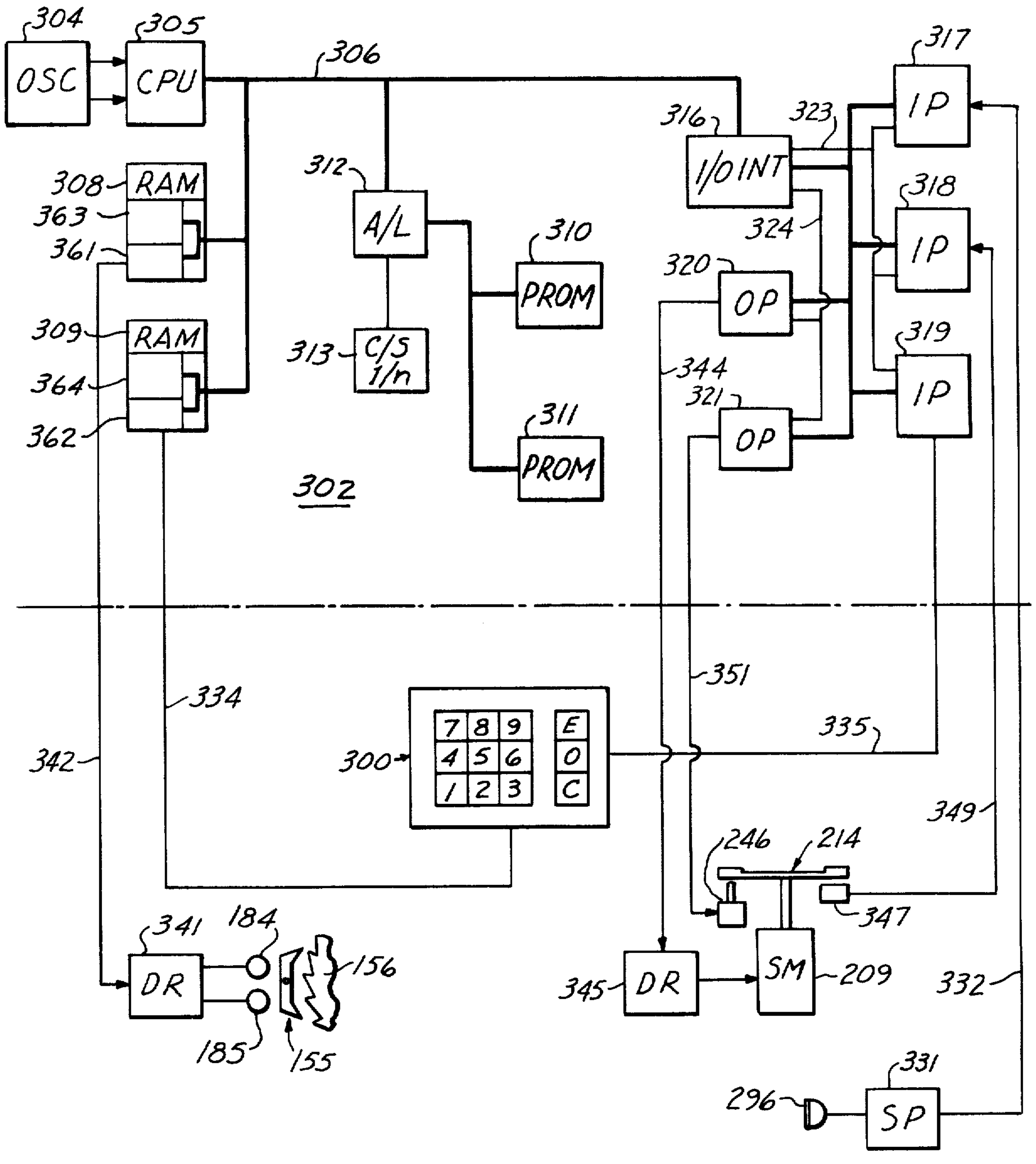
FIG. 16 is a block diagram of electronic equipment used in the portable billing apparatus herein disclosed and controlling functions thereof.

In particular, FIG. 5 shows the previously mentioned double pawl 155 which pivots around an axis 183. The pawl 155 is of a ferromagnetic material and is actuated by electromagnetic coils or solenoids 184 and 185 located on an armature 186. The pivot shaft 183 may be connected to the armature 186.

The double pawl 155 is designed in the manner of an escapement which, upon alternative energization of the coils 184 and 185, will permit stepped advancement of the ratchet wheel 156 and drum 89 in the direction of the arrow 187 which corresponds to the arrow 161 in FIG. 10. In this manner, advancement of the drum 89 can be easily controlled so that the wrapped card 23 on the drum is located, row for row, in the desired positions for the printing process.

Figures 2, 14, 15:
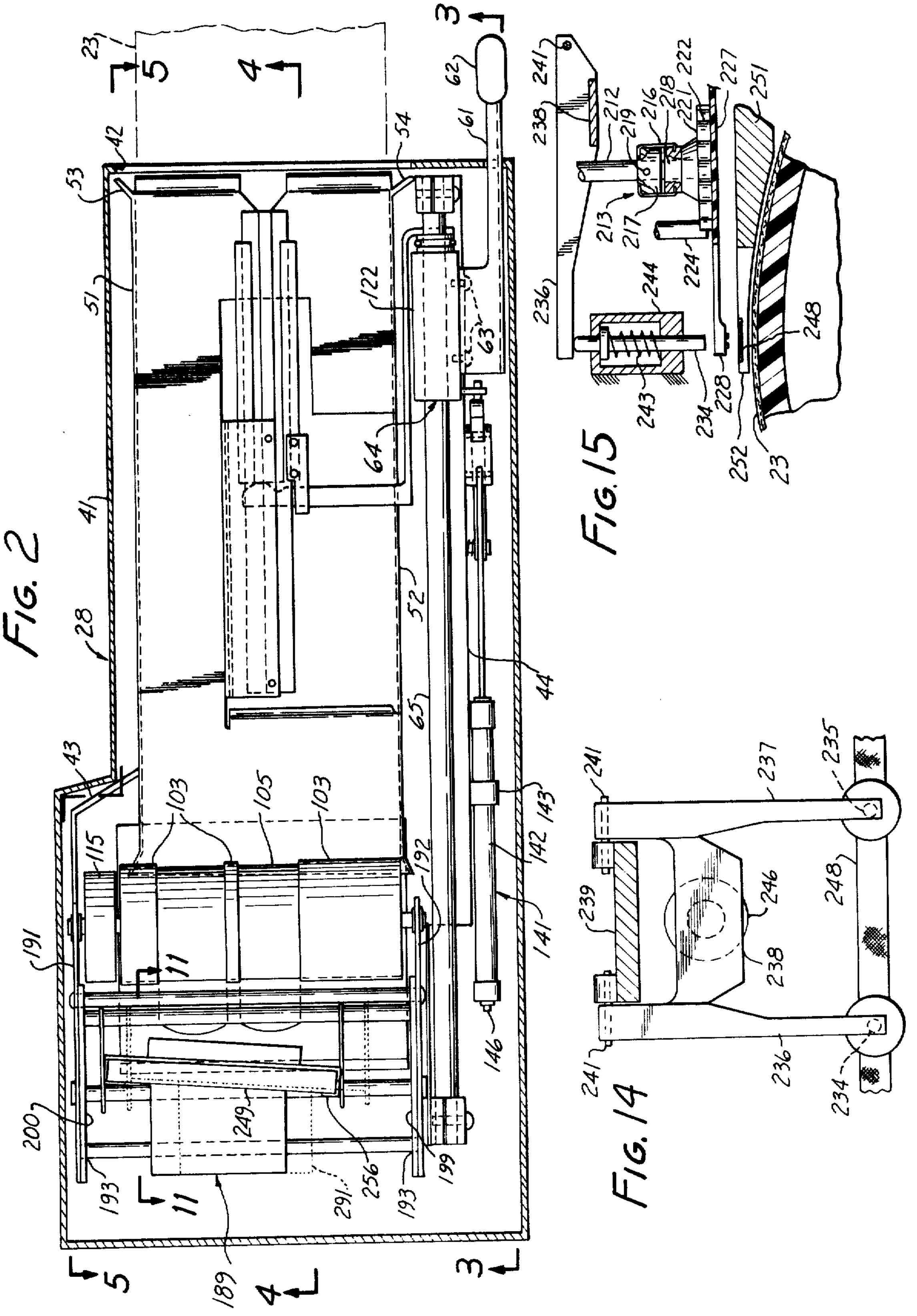
FIG. 2 is a plan view, with removed top, of a compact card moving and function performing apparatus in accordance with a preferred embodiment of the subject invention.
FIG. 14 is a partial section taken along the line 14 — 14 in FIG. 11.
FIG. 15 is a sectional elevation of a detail of FIG. 11 on an enlarged scale.

As shown in FIGS. 2 and 4, the previously described roller 105 and the printing assembly 189 are supported by side plates 191 and 192 which are pivoted relative to the frame structure at 193 so that the roller 105 and the printing assembly 189 can be swung outwardly as shown in phantom outline at 194 in FIG. 4. This facilitates servicing of the apparatus and access to the card on or at the drum 89.

As shown in dotted lines at 195 in FIG. 11, the printing mechanism 196 is detachable as a unit from the assembly 189. The printing mechanism is supported by a frame structure 198 having plates 199 and 200 cross tied together by rods 201, 202, 203 and 204.

The printing mechanism 196 has a mounting frame 206 pivotally mounted on rod 202. A bias spring 207 urges the frame 206 to its open position. A screw 208 retains the frame 206 in its active position shown in FIG. 11 against the bias of the spring 207.

A motor 209 is mounted on the frame 206. The motor 209, when energized, drives a shaft 212 which has a flexible coupling 213 attached thereto in a stepped manner.

The flexible coupling 213 links the motor shaft 212 to a printing head 214 shown in FIGS. 11 to 13. The flexible coupling 213 isolates the printing head 214 from pulsating motions which the motor shaft 212 executes at the end of a stepping operation. To this end, the flexible coupling 213 has buffer springs 216 which resiliently interconnect the coupling members 217 and 218. A set screw 219 attaches the coupling member 217 to the motor shaft 212.

The coupling part 218 forms a collar which conically blends into a ring 221 which has a plurality of notches 222, the number of which corresponds to the number of desired angular positions of the printing head. At least one detent 224 is biased by a spring 225 into the notches 222. In this manner, the motor 209 is capable of stepping the printing head to any desired angular position. However, pulsating motions of the motor shaft 212 are not transmitted to the printing head.

Rather, the detent 224 cooperating with notches 222 will retain the printing head stationary in any stepped position, while the coupling 213 with its buffer springs 216 will absorb motor shaft pulsations.

The printing head 214 has a plurality of flexible arms 226 projecting radially from a base 227. The base 227 is attached to the notched ring 221 and thus to the coupling piece or collar 218.

Each flexible arm 226 of the printing head has a flat tab at its extremity. The tabs 228 may be rectangular as shown in FIG. 13.

The tabs 228 of the printing head carry raised alphanumeric or clear text characters 229 or raised code text or encoded characters 231 in such an arrangement that an encoded character is located at a position 232 whenever its corresponding alphanumeric character is located at a position 233. In this manner, it is possible to print clear text and its corresponding encoded text simultaneously on a card 23 at different locations thereof. In particular, the printer according to the illustrated preferred embodiment is capable of printing information in clear text in either of the record parts 31 and 38 and simultaneously in code text in the record part 32 shown in FIG. 1.

To this end, the printer has two hammers 234 and 235 which are simultaneously struck by two actuators 236 and 237 which are simultaneously actuated by a common magnetic armature 238.

As shown in FIG. 14, the armature 238 is pivoted relative to a bracket 239 by pins 241.

Each of the hammers is biased to a retracted position by a spring 243 located in a relatively stationary housing 244.

In order to print corresponding alphanumeric and encoded characters, an electromagnetic coil or solenoid 246 is energized to attract the armature 38. This causes the actuators 236 and 237 to actuate the hammers 234 and 235 simultaneously, whereby these hammers simultaneously strike the tabs 228 which contain raised forms of the particular alphanumeric character and its encoded counterpart.

Ink for the printing process is derived from a ribbon 248 which is interposed between the printing head tabs 228 and the card 23 on the drum 89 at the locations 232 and 233 shown in FIG. 12.

The ribbon 248 is dispensed from a cartridge 249 which contains a supply of the ribbon.

A ribbon guide 251 has a guide portion 252 projecting under the ribbon 248 (see FIGS. 11, 12 and 15). As seen in FIG. 12, the guide portion 252 has cutouts 254 to clear the printing tabs 228 and arms 226 at the locations 232 and 233.

The ribbon 248 can be inserted or exchanged when the screw 208 has been loosened whereby the spring 207 swings the assembly 196 outwardly about the pivot 202 (see FIG. 11).

The printing mechanism 189 can be moved laterally on its supporting rod as shown in dotted lines at 291 in FIG. 2, so that different columns can be printed on the record cards.

As seen in FIGS. 3 and 8, the drum 89 has an arm 292 which contacts a stop 293 on the frame structure 44 when the drum 89 has returned to its initial position after completion of the printing operation.

As shown in FIG. 9, a hold down spring 295 may be provided to positively retain the card 23 as it is wrapped around the drum 89.

FIG. 9 also shows a readout head structure 296 which may be provided to read information from the card 23 at or in the vicinity of the drum 89. This would be in keeping with the broad scope of the subject invention, which contemplates printing, reading and/or the performance of another function or functions relative to the cards 23 in the region of the drum 89.

Now that an understanding concerning the illustrated preferred embodiment of the invention has been gained, it may be helpful to summarize the function of the illustrated apparatus in terms of the subject invention.

To this end, it will be recognized that each card 23 is placed in a first region of the apparatus 28 at the platform 56. The card 23 is then advanced with the aid of the unidirectional card advancing device 81 from the first region at the platform 56 by way of a first path 85 to a second region of the apparatus which is occupied by the drum 89.

During such movement of the card, a first edge portion of the card leads an opposite second edge portion of the card and, as shown in FIG. 9, is inserted into the drum recess 88.

In the illustrated preferred embodiment of the invention, the advance card is wrapped around the drum 89 which is rotated in the direction of the arrow 101 as described above in connection with FIGS. 4 and 9. The card having been completely wrapped around the drum 89, the direction of rotation of that drum is reversed and then proceeds in the direction of the arrow 161 shown in FIG. 10. The desired function relative to the card, such as printing and/or reading, may be performed at that juncture in the second region of the apparatus occupied by the drum 89.

Reverse rotation of the drum 89 in the direction of the arrow 161 makes the aforesaid second edge portion of the card (the previously trailing edge) lead the above mentioned first edge portion (the previously leading edge). As seen in FIG. 10, this now leading second edge portion is diverted by the spring 87 into the return path or channel 162. This second path 162 is different from the above mentioned first path 85 and leads from the second region occupied by the drum 89 back to the first region of the apparatus occupied by the two compartments which contain the unidirectional card advancing device 81 and the unidirectional card returning device 171, respectively, as shown in FIG. 4.

The unidirectional card returning device will complete the return of the card to the mentioned first region when the slide block 123 is returned to its initial position shown in FIG. 3, whereby the mentioned second edge portion of the card continues to lead the above mentioned first edge portion.

According to the illustrated preferred embodiment of the invention, the above mentioned first region is compartmentalized; a first compartment being defined by the platform 56 in the area occupied by the card advancing device 81, and a second compartment being defined by the lower platform 169 in the area occupied by the unidirectional card returning device 171.

The card advancing device 81 first advances the card from the mentioned first compartment by way of the path 85 leading to the second region occupied by the drum 89. Performance of the desired function or functions relative to the card in the second region proceed as before. The card is then moved by way of the return path 162 to the second compartment at the lower platform 169 with the aid of the spring 87, drum 89 and unidirectional card returning device 171.

As indicated at 23′ in FIG. 4, the cards 23 may be placed in the first compartment of the first region of the apparatus in the form of a stack of cards. Only a small fraction of the stack of cards is shown in FIG. 4 so as to avoid obscurement of important features of the illustrated apparatus.

In reality, the stack of cards is readily inserted through the slot 42 and input channel 45 in between the platform 56 and unidirectional card advancing device 81. No substantial resistance is put up by the device 81 against such insertion, since the entering stack of cards will contact the low-friction portion 83 of the device 81.

The unidirectional card advancing device 81 will advance the cards one by one from the stack 23′ in the first compartment since the high-friction portion 82 of the device 81 will rotate into force-transmitting engagement with each successive top card of the stack during each forward stroke of the device 81. On the other hand, the low-friction portion 83 of the device 81 will rotate into contact with each succeeding top card of the stack 23 during each return stroke of the device 81. In this manner, the card will not be shifted during the successive return strokes of the device 81.

On the other hand, the cards will be advanced one by one from the stack 23′ during successive forward strokes of the device 81, and will be thus advanced by way of the path 85 to the above mentioned second region occupied by the drum 89. As before, a first edge portion of each card leads an opposite second edge portion of that card during advancement to the second region.

The desired function, such as printing and/or reading, is performed on each card in the second region while wrapped around the drum 89.

The second or previously trailing edge portion of the particular card is then made to lead the previously leading or first edge portion of that card by rotating the drum in the direction of the arrow 161 shown in FIG. 10.

As a feature of the illustrated preferred embodiment of the invention, each card is moved from the second region occupied by the drum 89 to the second compartment below the platform 169 before the function in the second region is performed relative to the next card in the stack. In other words, the card 23 shown in FIG. 10 is removed from the drum via the return channel 162 before the next card is advanced onto the drum via the upper channel 85. The cards are successively returned from the second region at the drum 89 by way of the lower path 162 and with the aid of the unidirectional card returning device 171. Each returning card is engaged by the high-friction portion 176 of the device 171 which thereupon travels from the above mentioned advanced position to the initial position shown in FIG. 4. In this manner, the cards are stacked onto each other in the second compartment below the platform 169, as partially illustrated at 23″.

Whenever the device 171 is advanced from the initial position shown in FIG. 4 to the previously mentioned advanced position, the low-friction portion 177 will be rotated into contact with the underlying card, whereby the cards in the stack 23″ will not be shifted relative to each other.

At the end of a complete operation, the stack of cards 23″ may be removed from the lower second compartment through the slot 42. No substantial resistance to such removal will be put up by the device 171, since the low-friction portion 177 will then have been rotated into contact with the underlying card as the stack is manually pulled to the right as seen in FIG. 4.

As a special feature of the illustrated preferred embodiment of the invention, each card is first moved in the mentioned second region in a first direction away from the first path 85 by rotation of the drum 89 in the direction of the arrow 101 shown in FIGS. 4 and 9, and is then moved in such second region in a second direction opposite to the first direction to the second or return path 162 by rotation of the drum 89 in the direction of the arrow 161 as shown in FIG. 10 and described above.

Owing to these features, the above mentioned objects of the invention are all met in an economical and reliable manner, whereby very heavy and complex equipment is avoided, as are a jamming and misprinting or misreading of cards.

The subject extensive disclosure will suggest or render apparent various modifications and variations within the spirit and scope of the invention to those skilled in the art.

As a special feature of the illustrated preferred embodiment, all cards will be stacked in the same order at 23'' as they had been positioned at 23'. In this manner, the cards may be processed through the apparatus 28 two or more times in proper sequence, such as for a reading of different utility meters for the same households.

Suitable electronic equipment for the portable billing apparatus 28 will now be described with the aid of the last figure of the drawings.

Function and purpose of this electronic equipment are essentially as follows: To enable the photoelectric or magnetic reader 296 to read from each card 23 the information provided thereon by the utility computer 13 and printer 22, to enable the meter reader to input his readings into the portable billing apparatus by means of a keyboard 300, to calculate the new amount due on the basis of the billing information read from the card and the new meter reading supplied through the keyboard 300, to release the ratchet wheel 156 in a controlled manner for a stepped advancement of each card during the printing phase, to actuate the printing head 214 for a printing of the new meter reading and the new amount due on the cards 23 as mentioned above, and to actuate the printing hammers 246 during such printing process.

The heart of the electronic equipment of the portable billing apparatus is a microcomputer 302. Microcomputers have become well-known in recent years as they form the essential part of hand-held or other portable electronic calculating equipment and have found utility in other areas where small computers are of advantage. By way of example, and not by way of limitation, the microcomputer 302 may be adapted from the commercially available MCS-4 Microcomputer. Alternatives are apparent to an integrated circuit designer of average skill from the subject disclosure.

In particular, the microcomputer 302 has a two phase oscillator 304 which clocks a central processing unit (CPU) 305. A data bus 306 leads to and from the central processing unit 305. Random access memories (RAM) 308 and 309 are connected to the central processing unit 305 via data bus 306. Programed read only memories 310 and 311 are connectable to the central processing unit 305 via data bus 306 and an address latch 312. A chip selector 313 enables the address latch 312 to select one out of n programed read only memories which, in actuality, are preferably present in the form of integrated circuit chips, wherein n is the number of programed read only memories.

An input/output interface device 316 selectively connects input ports (IP), 317, 318 and 319 and output ports (OP) 320 and 321 to the central processing unit 305 via data bus 306. For this purpose, the interface device 316 in conjunction with the chip selector 313 provides an input command via a line 323 to the input ports 317 to 319, and an output command via a line 324 to the output ports 320 and 321.

The item 296 is preferably a code reader which, for instance, reads the billing information from the part 32 of the card as provided by the utility computer and printer. The signals produced by the reader 296 are amplified and processed by a signal processor 331 which may be of a basically conventional type.

A line 332 applies the amplified and processed read message to the input port 317 whence it is applied to the central processing unit 305 by the interface device 316 and data bus 306.

The RAM device 309 is preferably of a conventional integrated circuit design having an output port 362 in addition to a read/write memory 364.

The meter reader inputs the reading for the particular customer through the keyboard 300 which has digit keys (1 through 9), a decimal key (O), an entry key (E) and a clear key (C). The keyboard device 300 is preferably of a coordinate or cross-bar type receiving its input via a line 334 and output port 362 of the integrated RAM device 309 and supplying its output via a line 335 to the input port 319.

The data provided by the keyboard device 300 is supplied via the interface device 316 and data bus 306 to the central processing unit 305 where it is processed together with the billing information read by the reader 296. Such processing is effected under the control of the programed read only memories 310 and 311. Accordingly, information which applies to customers in general may be stored in the program of the read only memories thereby saving space on the cards 23 and additional reading steps.

The RAM device 308 is preferably of a conventional integrated circuit design having an output port 361 in addition to a read/write memory 363. As the microcomputer 302 has completed a calculating operation and is ready for the printing process, a driver 341 is energized via a line 342 and the output port 361 of the integrated RAM device 308. The driver 341 may be of a conventional type which alternatively energizes the electromagnets 184 and 185 in order to actuate the pawl 155 into controlling a stepped advance of the ratchet wheel 156 and thereby of the card wrapped on the drum 89.

Information on the data to be printed is supplied via the output port 320 and a line 344 to a driver 345.

The driver 345 may be of a conventional type which energizes the stepping motor 209 with electrical pulses so that the rotary printing head 214 is actuated to the correct angular position for the printing of each clear text and corresponding code text character.

In order to permit the equipment to orient itself as to the position of the printing head 214, an angular head position sensor 347 is provided. The sensor 347 may be of an electrooptical, electromagnetic or other conventional type to sense the actual angular position of the printing head 214. A line 349 applies the position sensing signal to the input port 318 for consideration by the central processing unit 305 in its control of the printing head.

Whenever the printing head 214 has been actuated to the desired angular printing position, the microcomputer 302 energizes the hammer actuator 246 via the output port 321 and a line 351.

Movement of the printing mechanism for printing in different columns on the card 31, if needed, may be controlled in a similar manner by the microcomputer 302 so that no specific equipment is disclosed for this purpose.

Rather, the figure under discussion discloses electronic equipment which will satisfy the basic data processing and control needs of the portable billing apparatus 28. Refinements for particular billing situations may be added on the basis of conventional circuit design.

We claim:

1. In a method of performing a function relative to a card, the improvement comprising in combination the steps of:

placing said card in a first region;

advancing said card from said first region by way of a first path to a second region, whereby a first edge portion of the card leads an opposite second edge portion of the card;

performing said function relative to said card in said second region;

providing a second path different from said first path and leading from said second region to said first region, and locating said second path between said first path and said second region;

making said second edge portion lead said first edge portion of the card;

depressing said leading second edge portion into said second path; and returning said card from said second region to said first region by way of said second path different from said first path with said second edge portion continuing to lead said first edge portion of the card.

2. A method as claimed in claim 1, wherein:

said first region is compartmentalized;

said card is positioned in a first compartment in said first region;

said card is advanced from said first compartment in said first region by way of a first path leading from said first compartment to said second region; and said card is moved from said second region to a second compartment in said first region by way of a second path leading from said second region to said second compartment in said first region.

3. A method as claimed in claim 2, wherein:

said card is first moved in said second region in a first direction away from said first path and is then moved in said second region in a second direction opposite to said first direction to said second path.

4. A method as claimed in claim 2, wherein:

said card is first rotated in said second region in a first sense away from said first path and is then rotated in said second region in a second sense toward said second path.

5. In a method of performing a function relative to a number of cards, the improvement comprising in combination the steps of:

placing said cards in the form of a stack of cards in a first compartment of a first region;

advancing said cards one by one from said stack of cards in said first compartment to a second region by way of a first path leading from said first compartment to said second region, whereby a first edge portion of each card leads an opposite second edge portion of that card;

performing said function relative to each card in said second region;

providing a second path different from said first path and leading from said second region to said first region, and locating said second path between said first path and said second region; and making said second edge portion of each card lead said first edge portion of that card and moving each card from said second region to a second compartment in said first region before said function is performed relative to the next card in said stack, the cards being moved from said second region to said second compartment in said first region by depressing said leading second edge portion of each card into said second path and advancing each card by way of said second path, the latter advanced cards being stacked in said second compartment in said first region.

6. A method as claimed in claim 5, wherein:

each card is first moved in said second region in a first direction away from said first path and is then moved in said second region in a second direction opposite to said first direction to said second path.

7. A method as claimed in claim 5, wherein:

each card is first rotated in said second region in a first sense away from said first path and is then rotated in said second region in a second sense toward said second path.

8. In apparatus for performing a function relative to a card, the improvement comprising in combination:

means for storing said card in a first region of said apparatus;

means defining a first channel between said first region and a second region of said apparatus;

means for advancing said card from said first region by way of said first channel to said second region, whereby a first edge portion of the card leads an opposite second edge portion of the card;

means for performing said function relative to said card in said second region;

means defining a second channel extending between said second region and said first region and being located between said first channel and said second region;

means for reversing the direction of movement of said card whereby said second edge portion leads said first edge portion; and means for depressing said leading second edge portion into said second channel, said reversing means including means for returning said card from said second region to said first region at said reversed direction of movement and by way of said second channel.

9. Apparatus as claimed in claim 8, wherein:

said apparatus includes means for defining distinct first and second compartments in said first region;

said storing means include means for storing said card in said first compartment;

said first channel defining means include means for defining said first channel between said first compartment and said second region;

said card advancing means including means for advancing said card from said first compartment by way of said first channel to said second region;
said second channel defining means include means for defining said second channel between said second region and said second compartment; and
said card returning means include means for returning said card from said second region to said second compartment by way of said second channel.

10. Apparatus as claimed in claim 9, including:
means for moving said card in said second compartment from said second channel to a rest position in said second compartment spaced from said first compartment.

11. Apparatus as claimed in claim 9, including:
means in said second region for moving said card, said moving means including means for first moving said card in said second region in a first direction away from said first channel and means for then moving said card in said second region in a second direction opposite to said first direction and toward said second channel.

12. Apparatus as claimed in claim 9, including:
rotary means in said second region;
means for wrapping said card about said rotary means in said second region; and
means for rotating said rotary means with said card in said second region, said rotating means including means for rotating said rotary means with said card in a first sense away from said first channel, and means for rotating said rotary means with said card alternatively in a second sense toward said second channel.

13. In apparatus for performing a function relative to a number of cards, the improvement comprising in combination:
means for defining a first compartment;
means for receiving said cards in the form of a stack of cards in said first compartment;
means for providing a first channel between said first compartment and a predetermined region of said apparatus;
means for advancing said cards one by one from said stack of cards in said first compartment to said predetermined region by way of said first channel, whereby a first edge portion of each card leads an opposite second edge portion of that card;
means for performing said function relative to each card in said predetermined region;
means for defining a second compartment;
means for providing a second channel extending between said predetermined region and said second compartment and being located between said first channel and said predetermined region;
means for reversing the direction of movement of each card in said predetermined region whereby said second edge portion of each card leads said first edge portion of that card; and
means for depressing said leading second edge portion of each card into said second channel, said reversing means include means for moving each card from said predetermined region to said second compartment before said function is performed relative to the next card in said stack, and for so moving each card in said reversed direction of movement from said predetermined region to said second compartment by way of said second channel; and
means for stacking said moved cards in said second compartment.

14. An apparatus as claimed in claim 13, including:
means in said predetermined region for moving said card, said moving means including means for first moving said card in said predetermined region in a first direction away from said first channel and means for then moving said card in said predetermined region in a second direction opposite to said first direction and toward said second channel.

15. An apparatus as claimed in claim 13, including:
rotary means in said predetermined region;
means for wrapping said card about said rotary means in said predetermined region; and
means for rotating said rotary means with said card in said predetermined region, said rotating means including means for rotating said rotary means with said card in a first sense away from said first channel, and means for rotating said rotary means with said card alternatively in a second sense toward said second channel.

16. In apparatus for performing a function relative to a card, the improvement comprising in combination:
means for storing said card in a first region of said apparatus;
means defining a first channel between said first region and a second region of said apparatus;
means defining a second channel extending between said second region and said first region and being located between said first channel and said second region;
means for advancing said card from said first region by way of said first channel to said second region, whereby a first edge portion of the card leads an opposite second edge portion of the card;
means in said second region for moving said card in a first direction wherein said first edge portion leads said second edge portion, and alternatively in a second direction wherein said second edge portion leads said first edge portion;
means for performing said function relative to said card in said second region;
means at said second region for positioning said leading first edge portion of said card into engagement with said card moving means in said second region and for alternatively depressing said leading second edge portion of said card into said second channel; and
means for returning said card from said second region to said first region by way of said second channel with said second end portion leading said returning card through said second channel.

17. An apparatus as claimed in claim 16, wherein:
said card moving means in said second region include rotary means, means for wrapping said card about said rotary means in said second region, and means for rotating said rotary means with said card in said second region, said rotating means including means for rotating said rotary means with said card in a first sense away from said first channel, and means for rotating said rotary means with said card alternatively in a second sense toward said second channel; and
said edge positioning and depressing means include means for positioning said leading first edge portion of said card into engagement with said rotary and wrapping means, and for alternatively depressing said leading second edge portion of said card into said second channel upon rotation of said rotary means with said card in said second sense toward said second channel.

* * * * *